United States Patent
Suzuki et al.

(10) Patent No.: US 10,336,267 B2
(45) Date of Patent: Jul. 2, 2019

(54) VEHICLE CONTROL APPARATUS

(71) Applicant: SUBARU CORPORATION, Tokyo (JP)

(72) Inventors: Masatsugu Suzuki, Tokyo (JP); Osamu Okada, Tokyo (JP); Norihito Machida, Tokyo (JP); Keisuke Kamada, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/870,743

(22) Filed: Jan. 12, 2018

(65) Prior Publication Data

US 2018/0265017 A1    Sep. 20, 2018

(30) Foreign Application Priority Data

Mar. 14, 2017  (JP) ................... 2017-048573

(51) Int. Cl.
*G07C 5/00* (2006.01)
*G07C 5/08* (2006.01)
(Continued)

(52) U.S. Cl.
CPC ............ *B60R 16/023* (2013.01); *B60R 25/24* (2013.01); *G05B 19/042* (2013.01); *G07C 5/008* (2013.01);
(Continued)

(58) Field of Classification Search
CPC ....... B60R 16/023; B60R 25/24; G07C 5/085; G07C 5/008; G05B 19/042; G05B 2219/25032; G05B 2219/2637
See application file for complete search history.

(56) References Cited

U.S. PATENT DOCUMENTS 8,086,091 B2 * 12/2011  Sotomaru .............. H04N 5/765
                                                               370/400
9,876,692 B2 *  1/2018  Lai .......................... H04L 43/08
(Continued)

FOREIGN PATENT DOCUMENTS

JP    2005-242871 A    9/2005
JP    2005-337017 A    12/2005
(Continued)

OTHER PUBLICATIONS

Japanese Decision to Grant a Patent issued in corresponding Japanese Patent Application No. 2017-048573, dated Oct. 23, 2018, with English Translation.
(Continued)

*Primary Examiner* — Russell Frejd
(74) *Attorney, Agent, or Firm* — McDermott Will & Emery LLP

(57) ABSTRACT

In a vehicle control apparatus, one or more control units, each configured to perform an arithmetic operation process in accordance with a program stored therein in advance to individually control an operating state of an activator mounted in a vehicle, are connected to a network communication path to form a vehicle network. The vehicle control apparatus includes an external communication unit and a monitoring unit. The external communication unit is connectable to or disconnectable from the network communication path and is configured to allow the vehicle to communicate externally. The monitoring unit is configured to determine a state of each of the one or more control units while the external communication unit is disconnected from the network communication path.

9 Claims, 6 Drawing Sheets

(51) Int. Cl.
    *B60R 25/24*     (2013.01)
    *B60R 16/023*     (2006.01)
    *G05B 19/042*     (2006.01)

(52) U.S. Cl.
    CPC .... *G07C 5/085* (2013.01); *G05B 2219/25032* (2013.01); *G05B 2219/2637* (2013.01)

(56) References Cited

U.S. PATENT DOCUMENTS

2005/0190619 A1    9/2005    Wakiyama
2014/0196114 A1    7/2014    Hirashima et al.

FOREIGN PATENT DOCUMENTS

| | | |
|---|---|---|
| JP | 2012-048488 A | 3/2012 |
| JP | 2014-226946 A | 12/2014 |
| JP | 2016-009380 A | 1/2016 |
| WO | 2013/038478 A1 | 3/2013 |

OTHER PUBLICATIONS

Japanese Notification of Reasons for Refusal issued in corresponding Japanese Patent Application No. 2017-048573, dated Aug. 28, 2018, with English Translation.

* cited by examiner

VEHICLE CONTROL APPARATUS

CROSS-REFERENCE TO RELATED APPLICATIONS

The present application claims priority from Japanese Patent Application No. 2017-048573 filed on Mar. 14, 2017, the entire contents of which are hereby incorporated by reference.

BACKGROUND

1. Technical Field

The present invention relates to vehicle control apparatuses, and more specifically to a vehicle control apparatus in which a plurality of control units are connected to each other via a network communication path.

2. Related Art

With advancements in techniques for electronically controlling a variety of vehicle behaviors or states, recent vehicles include a plurality of control units (e.g., electronic control units (ECUs)) for use in such control. The control units are each typically configured to perform an arithmetic operation process in accordance with a program stored therein in advance to control the operating state of an activator (output unit) mounted in a vehicle, thereby individually controlling a vehicle behavior or a vehicle state. Such control units often require common information. Consequently, the plurality of control units are connected to each other via a network communication path to form a vehicle network over which information is exchanged or shared. The vehicle network is called a controller area network (CAN), for instance.

A vehicle control apparatus in which a plurality of control units are connected to a network communication path is disclosed in, for example, Japanese Unexamined Patent Application Publication No. 2005-337017. In the disclosed vehicle control apparatus, when information such as a program stored in any one of the plurality of control units connected to the network communication path is rewritten, the remaining control units stop their communication and a rewriting control unit that performs a rewriting operation switches a communication mode to a high-speed communication mode so that a large amount of data can be communicated within a short period of time.

Traditional vehicle networks are separate from an external network in all cases, except for special cases such as when accessed using dedicated tools for maintenance, to ensure system reliability. However, with recent trends such as increasing demands for connectivity of vehicles or creation of laws on automatic emergency alert systems, systems in which vehicle networks are connected to an external network have been emerging. When a vehicle network is connected to an external network, a new access point for the vehicle network is created, which may result in the vehicle network being affected by external influences. One possible method to address such external influences is to always connect a monitoring unit to a network communication path to which an external communication unit is connected to monitor influences on the vehicle network by using the monitoring unit. In this method, however, the monitoring unit may be affected by external influences. In this case, it may be difficult to ensure detection of an influence on the vehicle network, and the system does not always maintain robustness.

SUMMARY OF THE INVENTION

It is desirable to provide a vehicle control apparatus that ensures the detection of external influences on a vehicle network.

An aspect of the present invention provides a vehicle control apparatus in which one or more control units, each configured to perform an arithmetic operation process in accordance with a program stored therein in advance to individually control an operating state of an activator mounted in a vehicle, are connected to a network communication path to form a vehicle network. The vehicle control apparatus includes an external communication unit connectable to or disconnectable from the network communication path and configured to allow the vehicle to communicate externally, and a monitoring unit configured to determine a state of each of the one or more control units while the external communication unit is disconnected from the network communication path.

An aspect of the present invention provides a vehicle control apparatus in which one or more control units, each configured to perform an arithmetic operation process in accordance with a program stored therein in advance to individually control an operating state of an activator mounted in a vehicle, are connected to a network communication path to form a vehicle network. The vehicle control apparatus includes a transmitter connectable to or disconnectable from the network communication path and configured to allow the vehicle to communicate externally, and circuitry configured to determine a state of each of the one or more control units while the transmitter is disconnected from the network communication path.

DETAILED DESCRIPTION

Figure 1:
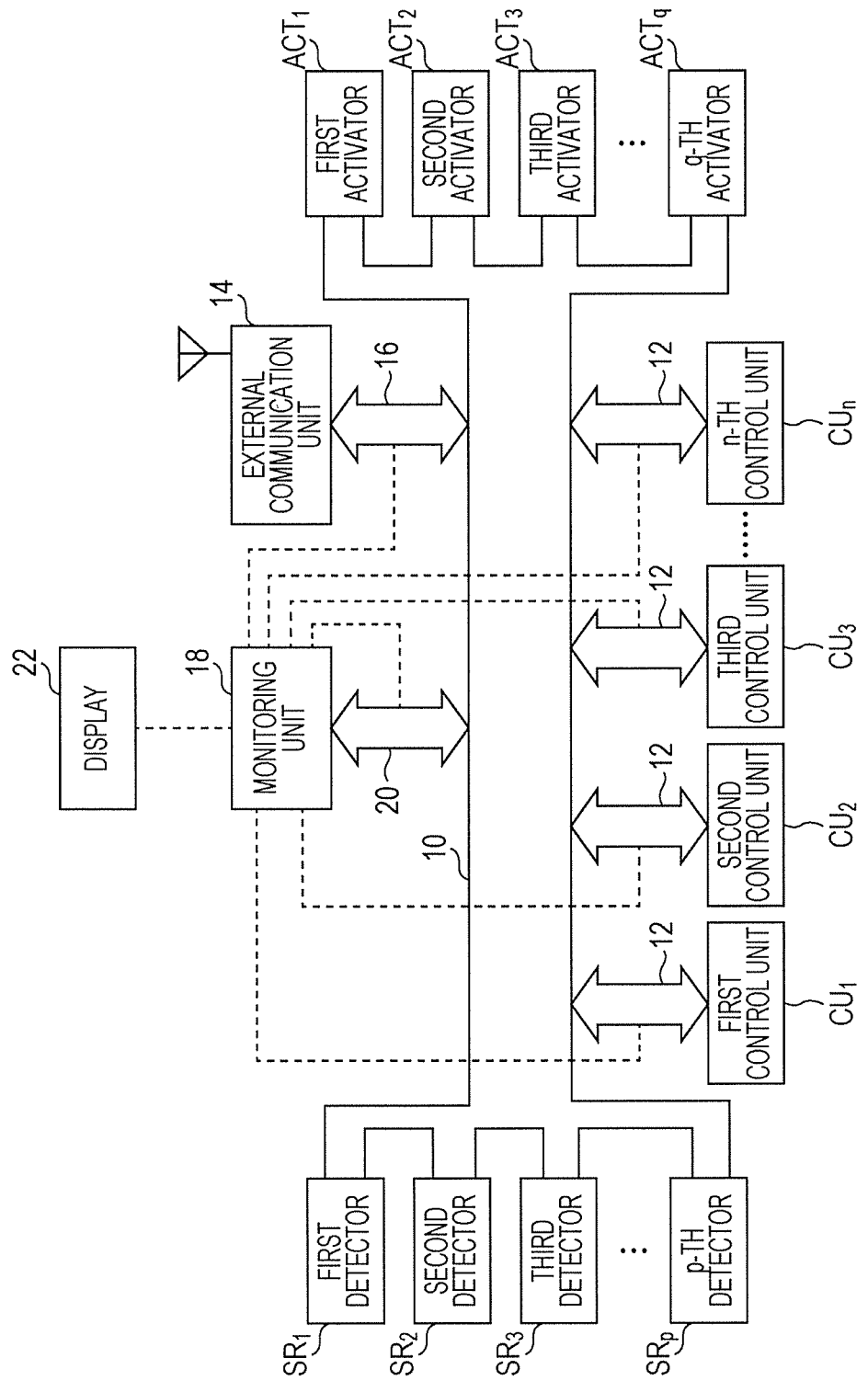
FIG. 1 is a system configuration diagram illustrating a schematic configuration of a vehicle network to which a vehicle control apparatus according to an example of the present invention is applied.

A vehicle control apparatus according to an example of the present invention will be described in detail hereinafter with reference to the drawings. FIG. 1 is a system configuration diagram illustrating a schematic configuration of a vehicle network to which the vehicle control apparatus according to this example is applied. Examples of a vehicle including the vehicle network include a station wagon vehicle and a sport utility vehicle (SUV), and the vehicle is driven by, for instance, an engine alone or by both an engine and a motor. The vehicle includes, similarly to a typical vehicle, devices and mechanisms such as a driving force transmission device that transmits a driving force, a braking device that operates on wheels to brake the vehicle, a steering device for steering the vehicle, and a travel speed control device for controlling the travel speed of the vehicle.

The vehicle includes a plurality of control units CU for electronically controlling a variety of behaviors or states of the vehicle. The control units CU are each configured to perform an arithmetic operation process in accordance with a program stored therein in advance, thereby individually controlling a vehicle behavior or a vehicle state. Thus, each of the control units CU includes a high-performance arithmetic processing unit such as a microcomputer, an input/output interface for inputting/outputting a signal, a memory device for storing programs or information, and other suitable devices.

The control units CU include, for example, an engine control unit that controls the operation state of the engine, a power control unit that controls the operation state of the motor when the motor is mounted as a drive source, a transmission control unit that controls the gear-shift state of a transmission, a braking control unit such as an anti-lock braking system (ABS) or a vehicle dynamics control (VDC) system that controls the braking force on the wheels or controlling the behaviors of the vehicle by controlling the braking force on the wheels, a traction control unit that controls the shares of the driving force on the wheels, a travel speed control unit that controls the travel speed of the vehicle by total control of the operation state of the engine and the gear-shift state of the transmission, and an air-conditioning control unit that controls the air-conditioning in the passenger compartment. Needless to say, other control units are also available. In this example, the control units are generically represented as the first control unit $CU_1$ to the n-th control unit $CU_n$, for instance.

These control units CU require a variety of types of information to control vehicle behaviors or vehicle states, and the vehicle is provided with various sensors or recognition devices to acquire these types of information. The recognition devices include, for example, a forward recognition device that detects an object ahead by using an image of the scene ahead the vehicle. In this example, the sensors or recognition devices are generically represented as the first detector $SR_1$ to the p-th detector $SR_p$, for instance. The control units CU also require implementations of the output corresponding to control instructions to control vehicle behaviors or vehicle states, and the vehicle is thus provided with activators (output units) ACT such as actuators, relays, and pumps. In this example, the activators such as actuators, relays, and pumps are generically represented as the first activator $ACT_1$ to the q-th activator $ACT_q$, for instance. The detectors SR and the activators ACT are directly connected to a network communication path 10 described below. The activators ACT may also include a display device such as a display and an acoustic device.

In this example, the control units CU described above are connectable to the network communication path 10. The network communication path 10 is common to the control units CU. Control unit connection/disconnection devices 12 are each interposed between one of the control units CU and the network communication path 10. The control unit connection/disconnection devices 12 enable the respective control units CU to be connected to the network communication path 10 or disconnected from the network communication path 10. For instance, the control unit connection/disconnection devices 12 are desirably incapable of easily accessing the control units CU that are disconnected from the network communication path 10. Examples of the control unit connection/disconnection devices 12 include devices that use light communication (Light Fidelity (Li-Fi)), circuit breakers, and laser communication. In this example, the plurality of control units CU are connected to the network communication path 10 via the respective control unit connection/disconnection devices 12 to form a vehicle network.

In this example, an external communication unit 14 is also connectable to the network communication path 10. The external communication unit 14 is capable of communicating with a network outside the vehicle. The external communication unit 14 enables communication between a network outside the vehicle and the vehicle network via wireless communication over Wireless Fidelity (Wi-Fi) based on, for instance, smartphones or navigation systems. The external communication unit 14 in this example is assumed to be based on wireless communication, or may be a wired or cable-based external communication device such as the tool dedicated to maintenance described above. The external communication unit 14 is also connectable to or disconnectable from the network communication path 10 by using an external communication unit connection/disconnection device 16. The external communication unit connection/disconnection device 16 may be similar to the control unit connection/disconnection device 12 described above.

In this example, furthermore, a monitoring unit 18 that monitors the vehicle network is also connectable to the network communication path 10 described above. The monitoring unit 18 includes, similarly to the control units CU, a high-performance arithmetic processing unit such as a microcomputer, an input/output interface for inputting/outputting a signal, a memory device for storing programs or information, and other suitable devices. The monitoring unit 18 performs an arithmetic operation process described below to detect external influences on the vehicle network, in particular, on the control units CU, and performs processing on an affected control unit CU to recover the affected control unit CU to a normal state or remove the affected control unit CU from the vehicle network if the affected control unit CU is unrecoverable.

The monitoring unit 18 is also connectable to or disconnectable from the network communication path 10 by using a monitoring unit connection/disconnection device 20. The monitoring unit connection/disconnection device 20 may be similar to the control unit connection/disconnection device 12 described above. In this example, as described below, the monitoring unit 18 determines the state of each of the control units CU via the network communication path 10. Alternatively, for instance, the monitoring unit 18 may be able to be directly connected to each of the control units CU to determine the state of the control unit CU. Even in this case, a device that connects or disconnects the monitoring unit 18 to or from the network communication path 10 is necessary since the monitoring unit 18 according to this example may act on behalf of the control units CU. The monitoring unit 18 is also connected to a display 22. The display 22 is disposed near the driver seat, for instance. While the display 22 may be, for example, one of the activators ACT described above, the display 22 is illustrated as a separate unit connected to the monitoring unit 18 since, in this example, the activators ACT are represented generically, rather than restrictively, as described above.

Figure 2:
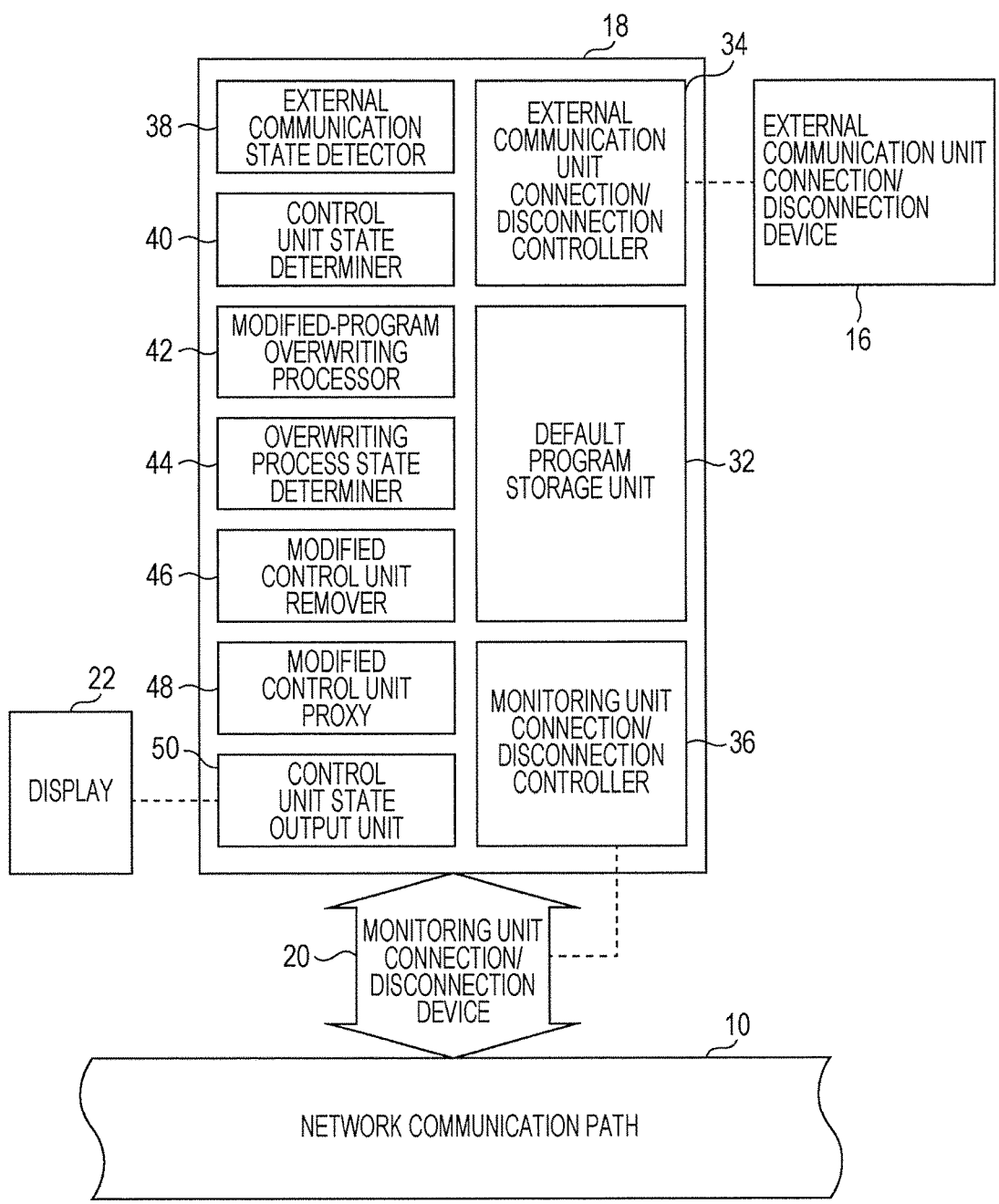
FIG. 2 is a block diagram illustrating a schematic configuration of a monitoring unit residing on the vehicle network illustrated in FIG. 1.

FIG. 2 is a block diagram illustrating a schematic configuration of the monitoring unit 18 described above. The monitoring unit 18 includes a default program storage unit 32, an external communication unit connection/disconnection controller 34, and a monitoring unit connection/disconnection controller 36. The default program storage unit 32 stores programs, each corresponding to a program stored in advance in one of the control units CU, as default programs. The external communication unit connection/disconnection controller 34 performs an individual arithmetic operation process (not illustrated) to control the external communication unit connection/disconnection device 16 to connect or disconnect the external communication unit 14 to or from the network communication path 10. The monitoring unit connection/disconnection controller 36 performs an individual arithmetic operation process (not illustrated) to control the monitoring unit connection/disconnection device 20 to connect or disconnect the monitoring unit 18 to or from the network communication path 10.

The monitoring unit 18 further includes an external communication state detector 38, a control unit state determiner 40, a modified-program overwriting processor 42, an overwriting process state determiner 44, a modified control unit remover 46, a modified control unit proxy 48, and a control unit state output unit 50. The external communication state detector 38 detects the external communication state of the external communication unit 14. The control unit state determiner 40 determines the state of each of the control units CU. If a program stored in any one of the control units CU is modified during external communication, the modified-program overwriting processor 42 performs an overwriting process to overwrite the modified program with the corresponding default program. The overwriting process state determiner 44 determines whether the overwriting process for the modified program has been completed. If the overwriting process for the modified program has not been completed, the modified control unit remover 46 disconnects the control unit CU for which the program has been modified (hereinafter referred to as a "modified control unit CU") from the network communication path 10. The modified control unit proxy 48 reads and installs the default program for the control unit CU to be disconnected, thereby acting on behalf of the control unit CU to be disconnected. The control unit state output unit 50 outputs the state of each of the control units CU to the display 22. These components are implemented by arithmetic operation processes described below.

Next, arithmetic operation processes for implementing the components illustrated in FIG. 2, namely, the external communication state detector 38, the control unit state determiner 40, the modified-program overwriting processor 42, the overwriting process state determiner 44, the modified control unit remover 46, the modified control unit proxy 48, and the control unit state output unit 50, will be described with reference to flowcharts illustrated in FIGS. 3 to 6. In this example, as described below, the monitoring unit 18 determines the state of each of the control units CU each time external communication is completed. As an example of the timing at which the monitoring unit 18 determines the state of each of the control units CU, the monitoring unit 18 may determine the state of each of the control units CU at predetermined time intervals, when the driver inputs an operation to determine the state of each of the control units CU, when an external request for the determination of the state of each of the control units CU is made, or when an event ahead which has been recognized by the forward recognition device does not match information shared over the vehicle network.

Figure 3:
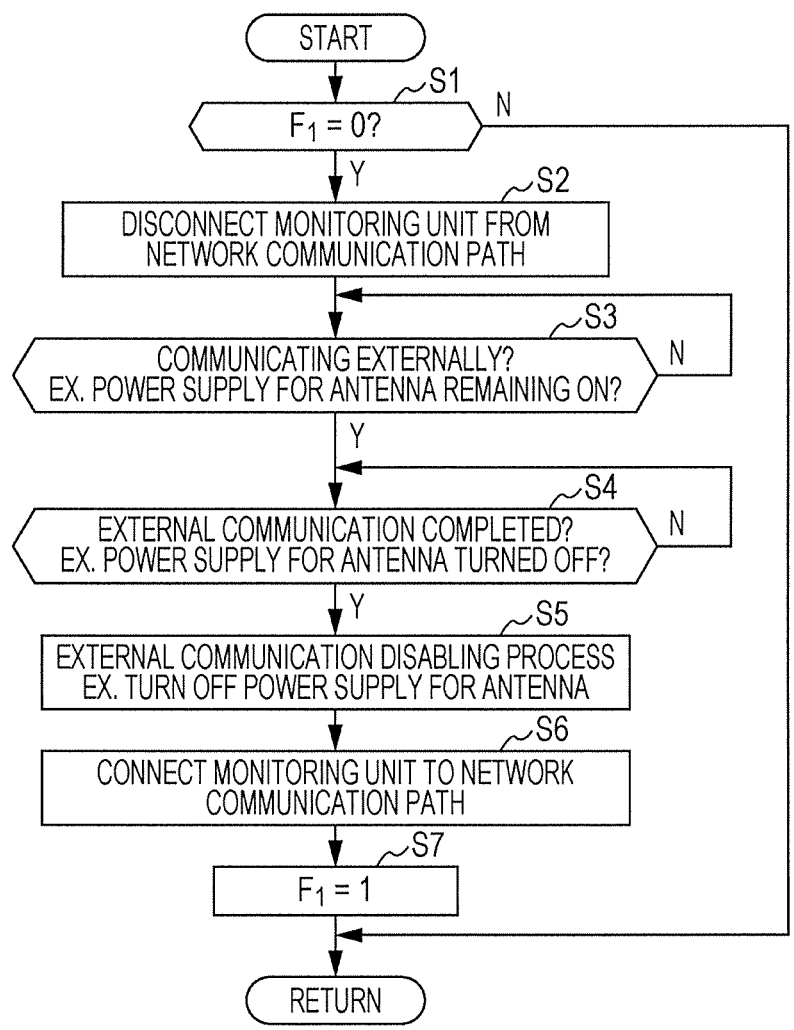
FIG. 3 is a flowchart illustrating an arithmetic operation process performed by the monitoring unit illustrated in FIG. 2.

The arithmetic operation process illustrated in FIG. 3 is executed within a preset sampling period, for instance. First, in step S1, the monitoring unit 18 determines whether a first flag $F_1$ has been reset to 0. If the first flag $F_1$ has been reset, the process proceeds to step S2. Otherwise, the process exits.

In step S2, the monitoring unit 18 disconnects itself from the network communication path 10. In this example, the disconnection of the monitoring unit 18 from the network communication path 10 is performed by causing the monitoring unit connection/disconnection device 20 to perform a disconnection operation.

Then, in step S3, the monitoring unit 18 determines whether the vehicle network is communicating externally. If the vehicle network is communicating externally, the process proceeds to step S4. Otherwise, the process enters standby. The vehicle network can be determined to be communicating externally when, for instance, a power supply for an antenna of the external communication unit 14 is in an on state.

In step S4, the monitoring unit 18 determines whether external communication of the vehicle network has been completed. If external communication has been completed, the process proceeds to step S5. Otherwise, the process enters standby. It can be determined that external communication of the vehicle network has been completed when, for instance, the power supply for the antenna of the external communication unit 14 is turned off.

In step S5, the monitoring unit 18 performs an external communication disabling process to prevent the vehicle network from communicating externally. In this example, the external communication disabling process is performed by causing the external communication unit connection/disconnection device 16 to perform a disconnection operation.

Then, in step S6, the monitoring unit 18 connects itself to the network communication path 10. In this example, the connection of the monitoring unit 18 to the network communication path 10 is performed by causing the monitoring unit connection/disconnection device 20 to perform a connection operation.

Then, in step S7, the first flag $F_1$ is set to 1. Then, the process exits.

Figure 4:
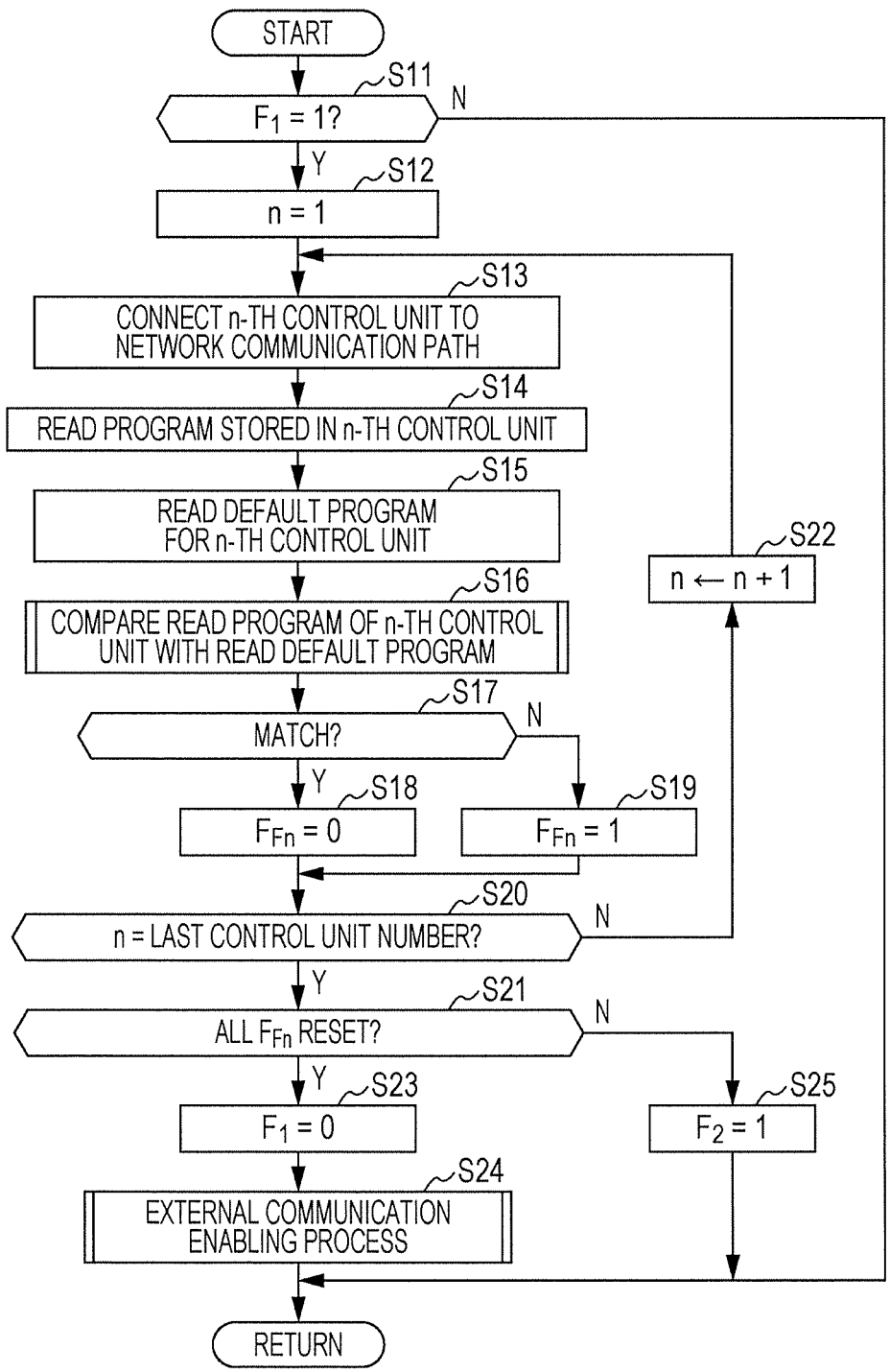
FIG. 4 is a flowchart illustrating an arithmetic operation process performed by the monitoring unit illustrated in FIG. 2.

The arithmetic operation process illustrated in FIG. 4 is executed within a preset sampling period, for instance. First, in step S11, the monitoring unit 18 determines whether the first flag $F_1$ has been set to 1. If the first flag $F_1$ has been set, the process proceeds to step S12. Otherwise, the process exits.

In step S12, the control unit number n is set to the initial value, i.e., 1.

Then, in step S13, the monitoring unit 18 causes the n-th control unit $CU_n$ to be connected to the network communication path 10. The connection of the n-th control unit $CU_n$ to the network communication path 10 is performed by causing the control unit connection/disconnection device 12 for the n-th control unit $CU_n$ to perform a connection operation.

Then, in step S14, the monitoring unit 18 reads a program stored in the n-th control unit $CU_n$ connected to the network communication path 10.

Then, in step S15, the monitoring unit 18 reads a default program for the n-th control unit $CU_n$, which is stored in the default program storage unit 32.

Then, in step S16, the monitoring unit 18 performs an individual arithmetic operation process (not illustrated) to compare the read program of the n-th control unit $CU_n$ with the corresponding default program.

Then, in step S17, the monitoring unit 18 determines whether the read program of the n-th control unit $CU_n$ and the corresponding default program match. If both match, the process proceeds to step S18. Otherwise, the process proceeds to step S19.

In step S18, the monitoring unit 18 resets an n-th control unit modification flag $F_{Fn}$ to 0. Then, the process proceeds to step S20.

On the other hand, in step S19, the monitoring unit 18 sets the n-th control unit modification flag $F_{Fn}$ to 1. Then, the process proceeds to step S20. The n-th control unit modification flag $F_{Fn}$ which is set to 1 indicates that the program stored in the n-th control unit $CU_n$ has been modified.

In step S20, the monitoring unit 18 determines whether the control unit number n is the last control unit number. If the control unit number n is the last control unit number, the process proceeds to step S21. Otherwise, the process proceeds to step S22.

In step S22, the control unit number n increments. Then, the process proceeds to step S13.

In step S21, the monitoring unit 18 determines whether all of the n-th control unit modification flags $F_{Fn}$ have been reset to 0. If all of the n-th control unit modification flags $F_{Fn}$ have been reset, the process proceeds to step S23. Otherwise, the process proceeds to step S25.

In step S23, the monitoring unit 18 resets the first flag $F_1$ to 0. Then, the process proceeds to step S24.

In step S24, the monitoring unit 18 performs an external communication enabling process to enable the vehicle network to communicate externally in accordance with an arithmetic operation process (not illustrated). Then, the process exits. In this example, as part of the external communication enabling process, the external communication unit connection/disconnection device 16 is caused to perform a connection operation.

On the other hand, in step S25, the monitoring unit 18 sets a second flag $F_2$ to 1. Then, the process exits.

Figure 5:
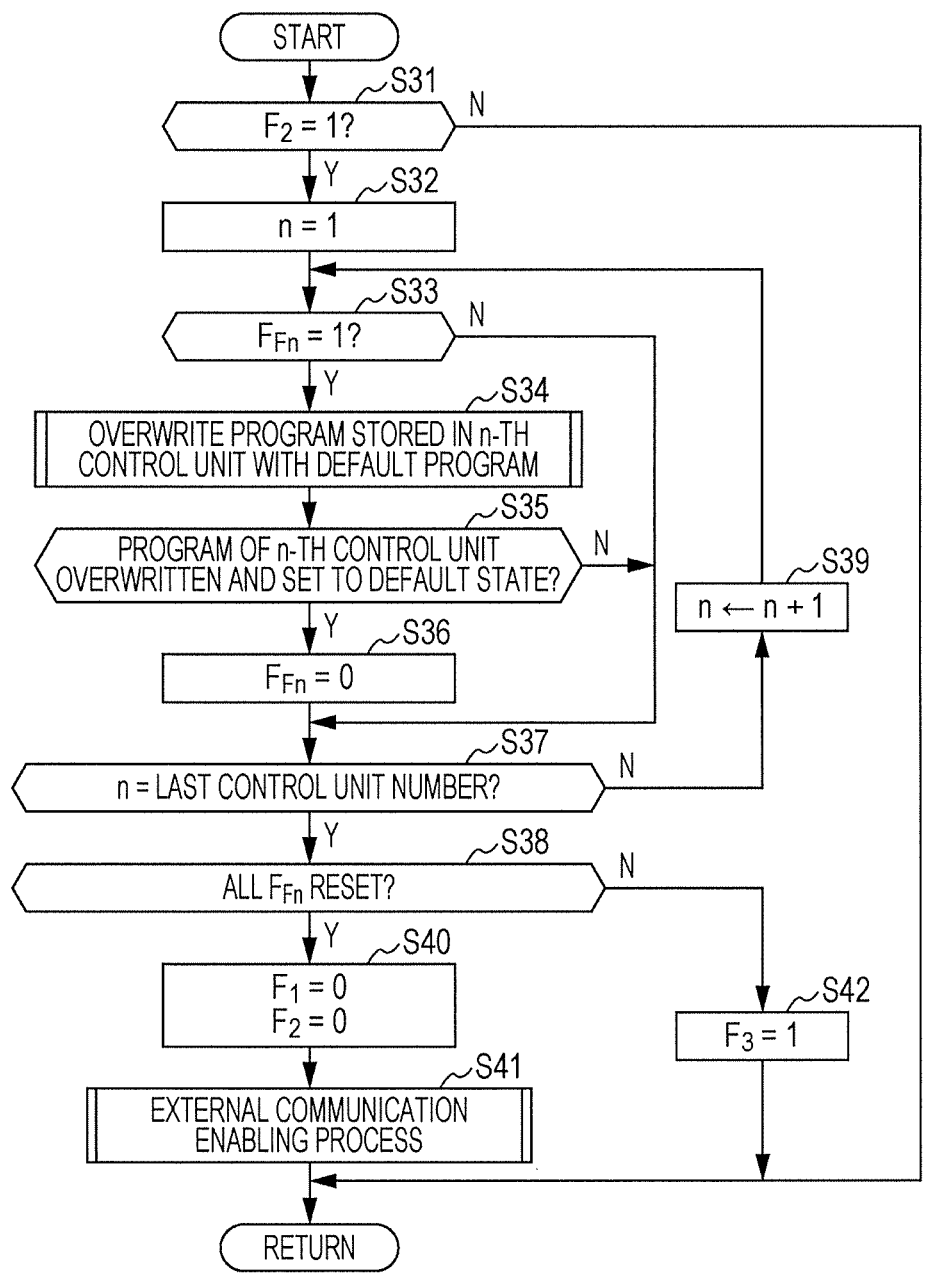
FIG. 5 is a flowchart illustrating an arithmetic operation process performed by the monitoring unit illustrated in FIG. 2.

The arithmetic operation process illustrated in FIG. 5 is executed within a preset sampling period, for instance. First, in step S31, the monitoring unit 18 determines whether the second flag $F_2$ has been set to 1. If the second flag $F_2$ has been set, the process proceeds to step S32. Otherwise, the process exits.

In step S32, the monitoring unit 18 sets the control unit number n to the initial value, i.e., 1.

Then, in step S33, the monitoring unit 18 determines whether the n-th control unit modification flag $F_{Fn}$ has been set to 1. If the n-th control unit modification flag $F_{Fn}$ has been set, the process proceeds to step S34. Otherwise, the process proceeds to step S37.

In step S34, the monitoring unit 18 performs an overwriting process on the n-th control unit $CU_n$ to overwrite the program stored in the n-th control unit $CU_n$ with the corresponding default program in accordance with an individual arithmetic operation process (not illustrated). Then, the process proceeds to step S35.

In step S35, the monitoring unit 18 determines whether the program stored in the n-th control unit CU, has been overwritten and set to a default state. If the program stored in the n-th control unit CU, has been overwritten and set to a default state, the process proceeds to step S36. Otherwise, the process proceeds to step S37.

In step S36, the monitoring unit 18 resets the n-th control unit modification flag $F_{Fn}$ to 0. Then, the process proceeds to step S37.

In step S37, the monitoring unit 18 determines whether the control unit number n is the last control unit number. If the control unit number n is the last control unit number, the process proceeds to step S38. Otherwise, the process proceeds to step S39.

In step S39, the control unit number n increments. Then, the process proceeds to step S33.

In step S38, the monitoring unit 18 determines whether all of the n-th control unit modification flags $F_{Fn}$ have been reset to 0. If all of the n-th control unit modification flags $F_{Fn}$ have been reset, the process proceeds to step S40. Otherwise, the process proceeds to step S42.

In step S40, the monitoring unit 18 resets both the first flag $F_1$ and the second flag $F_2$ to 0. Then, the process proceeds to step S41.

In step S41, the monitoring unit 18 performs an external communication enabling process to enable the vehicle network to communicate externally in accordance with an arithmetic operation process (not illustrated). Then, the process exits. In this example, as part of the external communication enabling process, the external communication unit connection/disconnection device 16 is caused to perform a connection operation.

On the other hand, in step S42, the monitoring unit 18 sets a third flag $F_3$ to 1. Then, the process exits.

Figure 6:
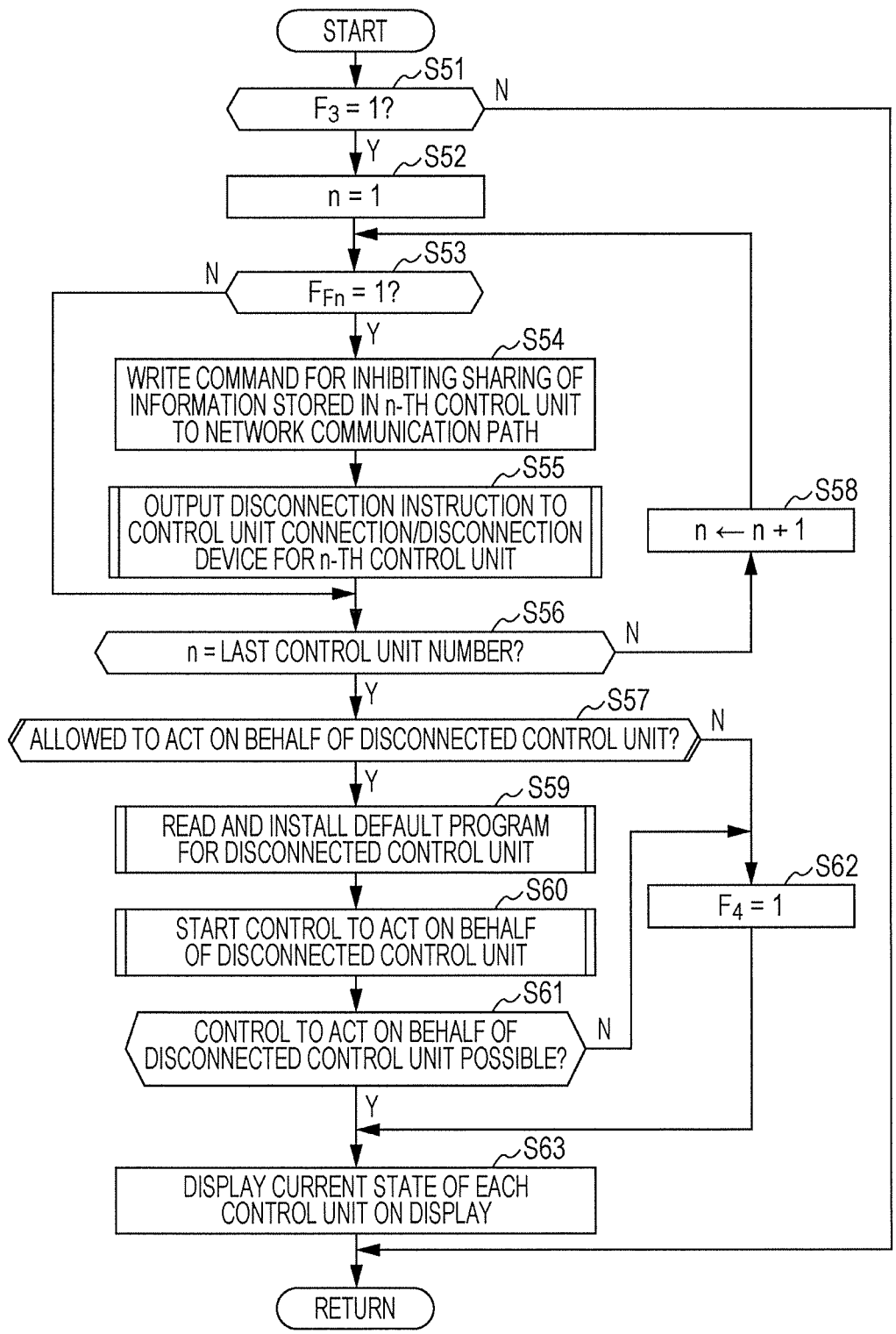
FIG. 6 is a flowchart illustrating an arithmetic operation process performed by the monitoring unit illustrated in FIG. 2.

The arithmetic operation process illustrated in FIG. 6 is executed within a preset sampling period, for instance. First, in step S51, the monitoring unit 18 determines whether the third flag $F_3$ has been set to 1. If the third flag $F_3$ has been set, the process proceeds to step S52. Otherwise, the process exits.

In step S52, the monitoring unit 18 sets the control unit number n to the initial value, i.e., 1.

Then, in step S53, the monitoring unit 18 determines whether the n-th control unit modification flag $F_{Fn}$ has been set to 1. If the n-th control unit modification flag $F_{Fn}$ has been set, the process proceeds to step S54. Otherwise, the process proceeds to step S56.

In step S54, the monitoring unit 18 writes a command for inhibiting sharing of information stored in the n-th control unit $CU_n$ to the network communication path 10. Then, the process proceeds to step S55.

In step S55, the monitoring unit 18 outputs a disconnection instruction to the control unit connection/disconnection device 12 for the n-th control unit $CU_n$ in accordance with an individual arithmetic operation process (not illustrated). Then, the process proceeds to step S56.

In step S56, the monitoring unit 18 determines whether the control unit number n is the last control unit number. If the control unit number n is the last control unit number, the process proceeds to step S57. Otherwise, the process proceeds to step S58.

In step S58, the control unit number n increments. Then, the process proceeds to step S53.

In step S57, the monitoring unit 18 determines, in accordance with an individual arithmetic operation process (not illustrated), whether the monitoring unit 18 is allowed to act on behalf of the disconnected control unit CU, that is, the modified control unit CU. If the monitoring unit 18 is allowed to act on behalf of the disconnected, modified control unit CU, the process proceeds to step S59. Otherwise, the process proceeds to step S62.

In step S59, the monitoring unit 18 performs an individual arithmetic operation process (not illustrated) to read a default program for the disconnected control unit CU, that is, the modified control unit CU, from the default program storage unit 32 and to install the default program therein. Then, the process proceeds to step S60.

In step S60, the monitoring unit 18 starts control to act on behalf of the disconnected control unit CU, that is, the modified control unit CU, in accordance with an individual arithmetic operation process (not illustrated). Then, the process proceeds to step S61.

In step S61, the monitoring unit 18 determines whether control in step S60 to act on behalf of the modified control unit CU is possible. If the control to act on behalf of the modified control unit CU is possible, the process proceeds to step S63. Otherwise, the process proceeds to step S62.

In step S62, the monitoring unit 18 sets a fourth flag $F_4$ to 1. Then, the process proceeds to step S63.

In step S63, the monitoring unit 18 displays the current state of each of the control units CU on the display 22. Then, the process exits.

In the arithmetic operation processes described above, the first flag $F_1$ which is reset indicates the normal state of the vehicle network, in which external communication of the vehicle network can be performed by using the external communication unit 14. In this state, the monitoring unit 18 is disconnected from the network communication path 10, and the monitoring unit 18 is not modified during external communication via the external communication unit 14. When external communication is completed in the normal state of the vehicle network, for instance, the external communication unit 14 is disconnected, which disables external communication of the vehicle network. In this state, the monitoring unit 18 is connected to the network communication path 10, and the first flag $F_1$ is set.

When the first flag $F_1$ is set, the control units CU are connected to the network communication path 10 in sequence, starting from the first control unit $CU_1$, and the program stored in each of the control units CU is read in this state and is compared with the corresponding default program. If both programs match, the n-th control unit modification flag $F_{Fn}$ is determined to have been reset. If both programs do not match, the n-th control unit modification flag $F_{Fn}$ is determined to have been set. That is, the n-th control unit $CU_n$ for which the n-th control unit modification flag $F_{Fn}$ has been set has a program modified during external communication. If all the n-th control unit modification flags $F_{Fn}$ have been reset, the first flag $F_1$ is reset and the vehicle network is enabled to communicate externally. If any one of the n-th control unit modification flags $F_{Fn}$ has been set, the second flag $F_2$ is set.

When the second flag $F_2$ is set, control units CU for which the n-th control unit modification flag $F_{Fn}$ has been set, that is, modified control units CU, are subjected to an overwriting process in sequence, starting from the first control unit $CU_1$, to overwrite the programs stored in the modified control units CU with the corresponding default programs. If it is possible to overwrite a program stored in each of the modified control units CU with the corresponding default program, the n-th control unit modification flag $F_{Fn}$ of the modified control unit CU is reset. As a result, if all the n-th control unit modification flags $F_{Fn}$ have been reset, the first flag $F_1$ and the second flag $F_2$ are reset and the vehicle network is enabled to communicate externally. If it is not possible to overwrite a program stored in each of the modified control units CU with the corresponding default program, the n-th control unit modification flag $F_{Fn}$ of the modified control unit CU remains set. As a result, if any one of the n-th control unit modification flags $F_{Fn}$ has been set, the third flag $F_3$ is set.

When the third flag $F_3$ is set, a command is output for inhibiting sharing of information stored in control units CU for which the n-th control unit modification flag $F_{Fn}$ has been set, that is, modified control units CU, in sequence, starting from the first control unit $CU_1$. In addition, the modified control units CU are disconnected from the network communication path 10, that is, from the vehicle network. Furthermore, it is determined whether the monitoring unit 18 is allowed to act on behalf of each of the disconnected control units CU, that is, on behalf of each of the modified control units CU. If the monitoring unit 18 is allowed to act on behalf of the modified control unit CU, the monitoring unit 18 reads and installs the default program for the modified control unit CU and starts control to act on behalf of the modified control unit CU. As a result, if the monitoring unit 18 is allowed to act on behalf of the disconnected control unit CU, that is, the modified control unit CU, the monitoring unit 18 continues to perform control to act on behalf of the modified control unit CU. On the other hand, if the monitoring unit 18 is not allowed to act on behalf of the modified control unit CU or if the monitoring unit 18 starts control to act on behalf of the modified control unit CU but is determined not to be actually allowed to perform control to act on behalf of the modified control unit CU, the fourth flag $F_4$ is set. Then, as a result of the foregoing processing, the current state of each of the control units CU is displayed on the display 22. Accordingly, the fourth flag $F_4$ which is reset and the third flag $F_3$ which is set indicate that a modified control unit CU has been disconnected and the monitoring unit 18 is allowed to perform control to act on behalf of the modified control unit CU. The fourth flag $F_4$ which is set indicates that a modified control unit CU has been disconnected but the monitoring unit 18 is not allowed to perform control to act on behalf of the modified control unit CU.

As described above, in the vehicle control apparatus according to this example, the control units CU, each configured to perform an arithmetic operation process in accordance with a program stored therein in advance to individually control the operating state of the corresponding one of the activators ACT mounted in the vehicle, are connected to the network communication path 10 to form a vehicle network. When the external communication unit 14, which is configured to allow the vehicle to communicate externally, is connectable to or disconnectable from the network communication path 10, the monitoring unit 18 determines the state of each of the control units CU while the external communication unit 14 is disconnected from the network communication path 10. This enables the monitoring unit 18 to monitor the control units CU with the external communication unit 14 being disconnected from the network communication path 10, that is, with the monitoring unit 18 being separated from and independent from the external environment. The monitoring unit 18 can thus be prevented from being affected during external communication via the external communication unit 14. This ensures that the monitoring unit 18, which is not affected by external influences, can detect external influences on the vehicle network.

Furthermore, the monitoring unit 18 may store programs, each of which corresponds to one of the programs stored in advance in the control units CU, as default programs. The monitoring unit 18 may compare a program stored in each of control unit CU with the corresponding default program while the external communication unit 14 is disconnected from the network communication path 10, determine that the control unit CU is in a normal state if both programs match, and determine that the control unit CU is a modified control unit if both programs do not match. Thus, the state of each of the control units CU can be determined more rapidly than when the calculation result or output of each of the control units CU is evaluated. This ensures that external influences on the vehicle network can be detected.

Furthermore, when a program stored in a control unit CU determined to be a modified control unit among the control units CU has been modified relative to a corresponding default program, the monitoring unit 18 may perform an overwriting process on the control unit CU to overwrite the program stored in the control unit CU with the corresponding default program. Thus, if it is possible to overwrite a modified program with the corresponding default program, external influences on the vehicle network can be eliminated and the vehicle network can be returned to the normal state.

Furthermore, the monitoring unit 18 may determine whether the overwriting process performed on the control unit CU determined to be a modified control unit has been completed. When the overwriting process has not been completed, the monitoring unit 18 may disconnect the control unit CU from the network communication path 10. Thus, if it is not possible to overwrite a modified program with the corresponding default program, the control unit CU having the modified program is disconnected from the network communication path 10, which allows elimination of external influences on the vehicle network.

Furthermore, when the control unit CU determined to be a modified control unit is to be disconnected from the network communication path 10, the monitoring unit 18 may execute a default program for the control unit CU to be disconnected to act on behalf of the control unit CU to be disconnected. Thus, if it is not possible to overwrite a modified program with the corresponding default program, the control unit CU having the modified program is disconnected from the network communication path 10, which allows elimination of external influences on the vehicle network. In addition, the monitoring unit 18 acts on behalf of a modified control unit CU, which enables the vehicle network to be returned to the normal state.

In the vehicle control apparatus according to the example described above, for instance, if the vehicle is owned by another person, the programs of all of the control units CU may be overwritten with the respective default programs to reset the previously accumulated information.

It is to be understood that the present invention embraces a variety of examples and the like that are not described herein. The technical scope of the present invention is defined by reference to the appended claims.

The monitoring unit 18 illustrated in FIG. 2 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the external communication state detector 38, the control unit state determiner 40, the modified-program overwriting processor 42, the overwriting process state determiner 44, the modified control unit remover 46, the modified control unit proxy 48, and the control unit state output unit 50. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the non-volatile memory may include a ROM and an NVRAM. The ASIC is an integrated circuit (IC) customized to perform, and the FPGA is an integrated circuit designed to be configured after manufacturing in order to perform, all or a part of the functions of the modules illustrated in FIG. 2.

The invention claimed is:

1. A vehicle control apparatus in which one or more control units, each configured to perform an arithmetic operation process in accordance with a program stored therein in advance to individually control an operating state of an activator mounted in a vehicle, are connected to a network communication path to form a vehicle network, the vehicle control apparatus comprising:
    an external communication unit connectable to or disconnectable from the network communication path and configured to allow the vehicle to communicate externally; and
    a monitoring unit configured to determine whether each of the one or more control units is in a normal state or in a modified state while the external communication unit is disconnected from the network communication path.

2. The vehicle control apparatus according to claim 1, wherein the monitoring unit stores programs, each of which corresponds to the program stored in advance in one of the one or more control units, as default programs, and
    wherein the monitoring unit
        compares a program stored in each of the one or more control units with the corresponding default program while the external communication unit is disconnected from the network communication path,
        determines that the control unit is in the normal state when the program and the corresponding default program match, and
        determines that the control unit is in the modified state when the program and the corresponding default program do not match.

3. The vehicle control apparatus according to claim 1, wherein the monitoring unit stores programs, each of which corresponds to the program stored in advance in one of the one or more control units, as default programs, and
    wherein when a program stored in a control unit determined to be a modified control unit among the one or more control units has been modified relative to a corresponding default program, the monitoring unit performs an overwriting process on the control unit to overwrite the program stored in the control unit with the corresponding default program.

4. The vehicle control apparatus according to claim 2, wherein when a program stored in a control unit determined to be the modified control unit among the one or more control units has been modified relative to a corresponding default program, the monitoring unit performs an overwriting process on the control unit to overwrite the program stored in the control unit with the corresponding default program.

5. The vehicle control apparatus according to claim 3, wherein the monitoring unit
    determines whether the overwriting process performed on the control unit determined to be a modified control unit has been completed, and when the overwriting process performed on the control unit determined to be a modified control unit has not been completed, disconnects the control unit determined to be a modified control unit from the network communication path.

6. The vehicle control apparatus according to claim 4, wherein the monitoring unit determines whether the overwriting process performed on the control unit determined to be a modified control unit has been completed, and when the overwriting process performed on the control unit determined to be a modified control unit has not been completed, disconnects the control unit determined to be a modified control unit from the network communication path.

7. The vehicle control apparatus according to claim 5, wherein when the control unit determined to be a modified control unit is to be disconnected from the network communication path, the monitoring unit executes a default program for the control unit to be disconnected to act on behalf of the control unit to be disconnected.

8. The vehicle control apparatus according to claim 6, wherein when the control unit determined to be a modified control unit is to be disconnected from the network communication path, the monitoring unit executes a default program for the control unit to be disconnected to act on behalf of the control unit to be disconnected.

9. A vehicle control apparatus in which one or more control units, each configured to perform an arithmetic operation process in accordance with a program stored therein in advance to individually control an operating state of an activator mounted in a vehicle, are connected to a network communication path to form a vehicle network, the vehicle control apparatus comprising:

a transmitter connectable to or disconnectable from the network communication path and configured to allow the vehicle to communicate externally; and circuitry configured to determine a state of each of the one or more control units while the transmitter is disconnected from the network communication path.

* * * * *